(12) United States Patent
Reynolds

(10) Patent No.: US 10,474,448 B2
(45) Date of Patent: *Nov. 12, 2019

(54) METHOD AND SYSTEM FOR PROVIDING SOFTWARE UPDATES TO LOCAL MACHINES

(71) Applicant: Sophos Limited, Abingdon (GB)

(72) Inventor: John Melton Reynolds, Oxford (GB)

(73) Assignee: Sophos Limited, Abingdon (GB)

( * ) Notice: Subject to any disclaimer, the term of this patent is extended or adjusted under 35 U.S.C. 154(b) by 49 days.

This patent is subject to a terminal disclaimer.

(21) Appl. No.: 15/903,852

(22) Filed: Feb. 23, 2018

(65) Prior Publication Data

US 2018/0181387 A1 Jun. 28, 2018

Related U.S. Application Data

(63) Continuation of application No. 15/287,115, filed on Oct. 6, 2016, now Pat. No. 9,934,025, which is a
(Continued)

(51) Int. Cl.
*G06F 9/44* (2018.01)
*G06F 8/65* (2018.01)
(Continued)

(52) U.S. Cl.
CPC .......... *G06F 8/65* (2013.01); *G06F 8/658* (2018.02); *G06F 16/182* (2019.01);
(Continued)

(58) Field of Classification Search
CPC ..... G06F 8/65; G06F 8/68; G06F 9/44; G06F 17/30194; G06F 15/16; H04L 41/082; H04L 12/6418
See application file for complete search history.

(56) References Cited

U.S. PATENT DOCUMENTS 6,430,608 B1    8/2002   Shaio et al.
6,499,110 B1 *   12/2002   Moses .................. G06F 21/602
                                                                  713/151
(Continued)

OTHER PUBLICATIONS

USPTO, "U.S. Appl. No. 15/287,115 Non-Final Office Action dated Oct. 6, 2017", 13 pages.
(Continued)

*Primary Examiner* — Lewis A Bullock, Jr.
*Assistant Examiner* — Tina Huynh
(74) *Attorney, Agent, or Firm* — Strategic Patents, P.C.

(57) ABSTRACT

In embodiments of the present invention improved capabilities are described for a updating software in a plurality of devices coupled to one another in a communicating relationship through a local network, the method comprising receiving a descriptor file for a software update at the first device from a remote source outside the local network, the descriptor file including a hash code for each of a plurality of update sub-files and an order for assembling the update sub-files into the software update, downloading the plurality of update sub-files to the first device from a remote source outside the local network until the sub-files identified in the descriptor file are present on the first device, where a presence of the sub-files is evaluated using the hash codes in the descriptor file, and broadcasting every one of the plurality of update sub-files from the first device to the number of other devices.

20 Claims, 4 Drawing Sheets

Related U.S. Application Data continuation of application No. 13/460,913, filed on May 1, 2012, now Pat. No. 9,489,193.

(51) Int. Cl.

| | | |
|---|---|---|
| *G06F 8/658* | (2018.01) | |
| *G06F 16/182* | (2019.01) | |
| *H04L 12/24* | (2006.01) | |
| *G06F 15/16* | (2006.01) | |
| *H04L 12/64* | (2006.01) | |

(52) U.S. Cl.
CPC .............. *H04L 41/082* (2013.01); *G06F 9/44* (2013.01); *G06F 15/16* (2013.01); *H04L 12/6418* (2013.01)

(56) References Cited

U.S. PATENT DOCUMENTS

| | | |
|---|---|---|
| 8,813,117 B1 | 8/2014 | Inskip, VI et al. |
| 2002/0100017 A1 | 7/2002 | Grier et al. |
| 2003/0177178 A1 | 9/2003 | Jones et al. |
| 2004/0006586 A1 | 1/2004 | Melchione et al. |
| 2005/0010794 A1 | 1/2005 | Carpentier et al. |
| 2005/0132348 A1 | 6/2005 | Meulemans et al. |
| 2006/0080454 A1 | 4/2006 | Li et al. |
| 2006/0149806 A1 | 7/2006 | Scott et al. |
| 2009/0210484 A1 | 8/2009 | Schneider et al. |
| 2009/0271779 A1 | 10/2009 | Clark et al. |
| 2011/0125792 A1 | 5/2011 | Fukuda et al. |
| 2011/0126185 A1 | 5/2011 | Waris et al. |
| 2012/0331307 A1* | 12/2012 | Fernandez Gutierrez .................... G06F 21/72 713/190 |
| 2013/0219383 A1 | 8/2013 | Hilerio et al. |
| 2013/0298117 A1 | 11/2013 | Reynolds |
| 2017/0090906 A1 | 3/2017 | Reynolds |

OTHER PUBLICATIONS

USPTO, "U.S. Appl. No. 15/287,115 Notice of Allowance dated Nov. 30, 2017", 7 pages.

USPTO, "U.S. Appl. No. 13/460,913, Final Office Action dated Jun. 4, 2015", 16 pages.

USPTO, "U.S. Appl. No. 13/460,913, Non-Final Office Action dated Jan. 21, 2016", 17 pages.

"U.S. Appl. No. 13/460,913, Non-Final Office Action dated Jul. 31, 2014", 11 pages.

USPTO, "U.S. Appl. No. 13/460,913, Notice of Allowance dated Jul. 15, 2016", 16 pages.

* cited by examiner

METHOD AND SYSTEM FOR PROVIDING SOFTWARE UPDATES TO LOCAL MACHINES

CROSS-REFERENCE TO RELATED APPLICATIONS

This application is a continuation of U.S. patent application Ser. No. 15/287,115, filed Oct. 6, 2016, which is a continuation of U.S. patent application Ser. No. 13/460,913 (now issued as U.S. Pat. No. 9,489,193), filed May 1, 2012, with the entire contents of each of these applications hereby incorporated herein by reference.

BACKGROUND

Field

The present invention is related to the distribution of software updates to computing facilities, and more specifically to distribution of software updates to local machines.

Description of the Related Art

Computers in an organization need to obtain updates for installed software. Within local group of computers, the software installed is often the same or similar across computers. This means that the data for the updates may have a great deal of similarity between computers. However, current solutions place a large load on the organization's network and Internet connection. Many software updates are currently delivered by direct download, for example using ftp or http, and still rely on direct one-to-one connections between computers, which potentially leads to additional network traffic. Therefore a need exists to provide software computer updates with lower network utilization.

SUMMARY

In embodiments, the present invention may provide for methods and systems with significantly lower network utilization for the case where updates are common to a number of computers.

In embodiments of the present invention, a method may be provided for updating software in a plurality of local computing devices including providing a software update as a plurality of update sub-files; providing a descriptor file, wherein the descriptor file includes a hash code for each one of the plurality of update sub-files and indicates an order in which the plurality of update sub-files assemble into the software update; transmitting the descriptor file to the plurality of local computing devices; downloading one of the plurality of update sub-files to one of the plurality of local computing devices that does not currently have the one of the plurality of update sub-files stored in its memory as determined by a comparison of the hash code included in the descriptor file with the hash codes for the sub-files currently stored in its memory; broadcasting the one of the plurality of update sub-files from the one of the plurality of local computing devices to other ones of the plurality of local computing devices, wherein each of the other ones of the plurality of local computing devices compares the hash code for the one of the plurality of update sub-files to hash codes of update sub-files that are already in its memory, and if not found to already be in its memory, stores the one of the plurality of update sub-files in its memory; and comparing all the hash codes of the update sub-files provided in the descriptor file to the hash codes for sub-files stored in memory of at least one of the plurality of local computing devices, and if all sub-files are found to be in its memory, assembling the software update from the plurality of update sub-files and installing the software update. In embodiments, the memory may be a cache memory. The at least one of the plurality of local computing devices may determine if the software update is relevant to resident software on the computing device through matching an identifier for the software update contained in the descriptor file to identifiers for resident software on the computing device. The at least one of the plurality of local computing devices may be a first computing device that downloads the descriptor file and a first update sub-file, and where the first computing device then broadcasts the first update sub-file to a second computing device of the plurality of local computing devices prior to the second computing device receiving the descriptor file, and the second computing device identifies the first update sub-file as relevant through an identifier for the software update included with the broadcast from the first computing device, and stores the first update sub-file in memory if the update is determined to be relevant. The descriptor file may be transmitted to the plurality of local computing devices in a secure manner that includes a digital signature. The size of the update sub-files may be such that they fit in a single broadcast packet. The single broadcasted packet may include a copy of the hash code to increase the efficiency of the packet receiver process in the other ones of the plurality of local computing devices. The broadcast of the update sub-files may be encrypted. The rate of broadcasts may be set low to allow the computing devices to perform updates over a period of time to minimize impacts to network utilization. The order in which the one of the plurality of local computing device broadcasts update sub-files to the other ones of the plurality of local computing devices may be randomized to reduce the probability of two local computing devices broadcasting on the local network at the same time.

In embodiment of the present invention, a system may be provided for updating software on a plurality of local computing devices including a software update facility in network communication with the plurality of local computing devices, wherein the software update facility includes a plurality of update sub-files and a descriptor file stored in memory, where the update sub-files make up a software update when combined together, and the software update descriptor file is transmitted to the plurality of local computing devices and includes a hash code for each of the update sub-files; and an updating facility on each of the plurality of local computing devices, wherein at least one of the plurality of local computing devices downloads an update sub-file from the software update facility, where the download is for an update sub-file that the at least one of the plurality of computing devices does not currently have stored in its memory as determined by a comparison of the hash code included in the descriptor file with the hash codes for the sub-files currently stored in its memory, wherein the at least one of the plurality of local computing devices broadcasts the downloaded update sub-file to the other ones of the plurality of local computing devices, where each of the remaining plurality of local computing devices compares the hash code for the broadcasted update sub-file to hash codes of update sub-files that are already in its memory, and if not found to already be in its memory, stores the broadcasted update sub-file in its memory, and wherein at least one of the plurality of local computing devices assembles the software update from the plurality of update sub-files and installs the software update if all of the hash codes of the update sub-files provided in the software update descriptor file match hash codes for the sub-files stored in its memory. In embodiments, the memory may be a cache memory. The at least one of the plurality of local computing devices may determine if the software update is relevant to resident software on the computing device through matching an identifier for the software update contained in the descriptor file to identifiers for resident software on the computing device. The at least one of the plurality of local computing devices may be a first computing device that downloads the descriptor file and a first update sub-file, and where the first computing device then broadcasts the first update sub-file to a second computing device of the plurality of local computing devices prior to the second computing device receiving the descriptor file, and the second computing device identifies the first update sub-file as relevant through an identifier for the software update included with the broadcast from the first computing device, and stores the first update sub-file in memory if the update is determined to be relevant. The descriptor file may be transmitted to the plurality of local computing devices in a secure manner that includes a digital signature. The size of the update sub-files may be such that they fit in a single broadcast packet. The single broadcasted packet may include a copy of the hash code to increase the efficiency of the packet receiver process in the other ones of the plurality of local computing devices. The broadcast of the update sub-files may be encrypted. The rate of broadcasts may be set low to allow the computing devices to perform updates over a period of time to minimize impacts to network utilization. The order in which the one of the plurality of local computing device broadcasts update sub-files to the other ones of the plurality of local computing devices may be randomized to reduce the probability of two local computing devices broadcasting on the local network at the same time.

In embodiments of the present invention, a method may be provided for updating software in a plurality of devices coupled to one another in a communicating relationship through a local network, the plurality of devices including a first device and a number of other devices, the method including receiving a descriptor file for a software update at the first device from a first remote source outside the local network, the descriptor file including a hash code for each of a plurality of update sub-files of the software update and an order for assembling the update sub-files into the software update; downloading one or more of the plurality of update sub-files to the first device from a second remote source outside the local network until every one of the sub-files of the software update identified in the descriptor file are present on the first device, wherein a presence of one of the sub-files is evaluated using the hash codes in the descriptor file; and broadcasting every one of the plurality of update sub-files from the first device to the number of other devices using a broadcast protocol of the local network. In embodiments, the first remote source and the second remote source may be a single remote source. The broadcasting of the descriptor file from the first device to the number of other devices may utilize the broadcast protocol. The descriptor file may be applied to assemble the software update from the plurality of sub-files on one of the number of other devices. A relevance of the software update may be evaluated to the one of the number of other devices. The descriptor file may be applied to assemble the software update from the plurality of sub-files on the first device. The software update may be installed on the first device.

In embodiments of the present invention, a method may be provided for updating software in a plurality of devices coupled to one another in a communicating relationship through a local network, the plurality of devices including a first device and a number of other devices, the method including transferring a descriptor file for a software update to the first device from a mobile storage device, the descriptor file including a hash code for each of a plurality of update sub-files of the software update and an order for assembling the update sub-files into the software update; transferring the plurality of update sub-files to the first device from the mobile storage device; transmitting the descriptor file for the software update from the first device to the number of other devices; and broadcasting each of the plurality of update sub-files from the first device to the number of other devices using a broadcast protocol of the local network. In embodiments, each of the number of other devices may check for the presence of each broadcasted update sub-file with update sub-files already stored in its memory by evaluating the hash codes in the descriptor file. The mobile storage device may be connected to the first device through a USB interface.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures.

While the invention has been described in connection with certain preferred embodiments, other embodiments would be understood by one of ordinary skill in the art and are encompassed herein.

All documents referenced herein are hereby incorporated by reference.

DETAILED DESCRIPTION

Figure 1:
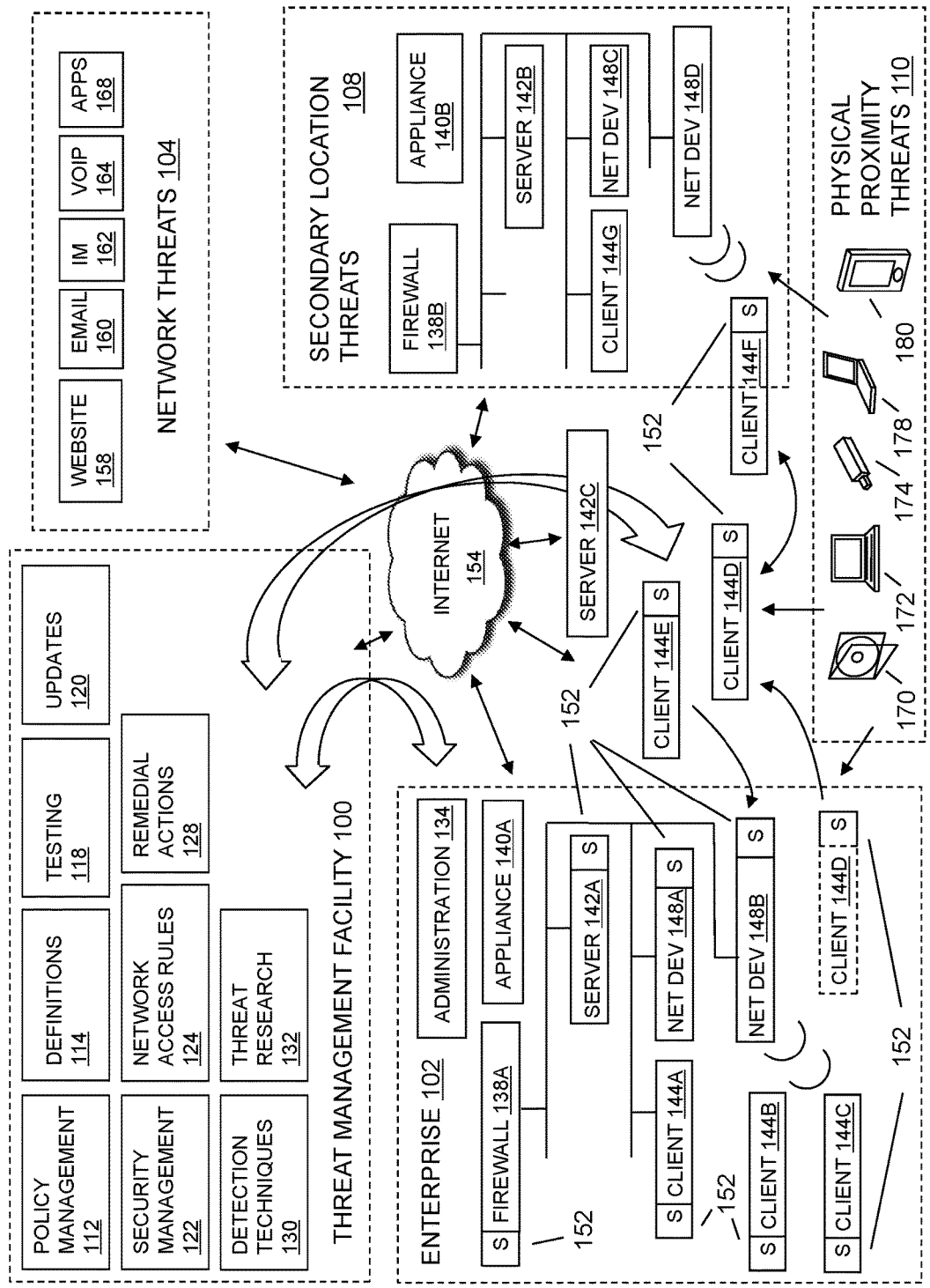
FIG. 1 depicts a block diagram of a threat management facility providing protection to an enterprise against a plurality of threats.

FIG. 1 depicts a block diagram of a threat management facility providing protection to an enterprise against a plurality of threats. An aspect of the present invention relates to corporate policy management and implementation through a unified threat management facility 100. As will be explained in more detail below, a threat management facility 100 may be used to protect computer assets from many threats, both computer-generated threats and user-generated threats. The threat management facility 100 may be multi-dimensional in that it may be designed to protect corporate assets from a variety of threats and it may be adapted to learn about threats in one dimension (e.g. worm detection) and apply the knowledge in another dimension (e.g. spam detection). Policy management is one of the dimensions for which the threat management facility can provide a control capability. A corporation or other entity may institute a policy that prevents certain people (e.g. employees, groups of employees, types of employees, guest of the corporation, etc.) from accessing certain types of computer programs. For example, the corporation may elect to prevent its accounting department from using a particular version of an instant messaging service or all such services. In this example, the policy management facility 112 may be used to update the policies of all corporate computing assets with a proper policy control facility or it may update a select few. By using the threat management facility 100 to facilitate the setting, updating and control of such policies the corporation only needs to be concerned with keeping the threat management facility 100 up to date on such policies. The threat management facility 100 can take care of updating all of the other corporate computing assets.

It should be understood that the threat management facility 100 may provide multiple services, and policy management may be offered as one of the services. We will now turn to a description of certain capabilities and components of the threat management system 100.

Over recent years, malware has become a major problem across the internet 154. From both technical and user perspectives, the categorization of a specific threat type, whether as virus, worm, spam, phishing exploration, spyware, adware, or the like, is becoming reduced in significance. The threat, no matter how it is categorized, may need to be stopped at various points of a networked computing environment, such as one of an enterprise facility 102, including at one or more laptops, desktops, servers, gateways, communication ports, handheld or mobile devices, firewalls, and the like. Similarly, there may be less and less benefit to the user in having different solutions for known and unknown threats. As such, a consolidated threat management facility 100 may need to apply a similar set of technologies and capabilities for all threats. In certain embodiments, the threat management facility 100 may provide a single agent on the desktop, and a single scan of any suspect file. This approach may eliminate the inevitable overlaps and gaps in protection caused by treating viruses and spyware as separate problems, while simultaneously simplifying administration and minimizing desktop load. As the number and range of types of threats has increased, so may have the level of connectivity available to all IT users. This may have lead to a rapid increase in the speed at which threats may move. Today, an unprotected PC connected to the internet 154 may be infected quickly (perhaps within 10 minutes) which may require acceleration for the delivery of threat protection. Where once monthly updates may have been sufficient, the threat management facility 100 may automatically and seamlessly update its product set against spam and virus threats quickly, for instance, every five minutes, every minute, continuously, or the like. Analysis and testing may be increasingly automated, and also may be performed more frequently; for instance, it may be completed in 15 minutes, and may do so without compromising quality. The threat management facility 100 may also extend techniques that may have been developed for virus and malware protection, and provide them to enterprise facility 102 network administrators to better control their environments. In addition to stopping malicious code, the threat management facility 100 may provide policy management that may be able to control legitimate applications, such as VoIP, instant messaging, peer-to-peer file-sharing, and the like, that may undermine productivity and network performance within the enterprise facility 102.

The threat management facility 100 may provide an enterprise facility 102 protection from computer-based malware, including viruses, spyware, adware, Trojans, intrusion, spam, policy abuse, uncontrolled access, and the like, where the enterprise facility 102 may be any entity with a networked computer-based infrastructure. In an embodiment, FIG. 1 may depict a block diagram of the threat management facility 100 providing protection to an enterprise against a plurality of threats. The enterprise facility 102 may be corporate, commercial, educational, governmental, or the like, and the enterprise facility's 102 computer network may be distributed amongst a plurality of facilities, and in a plurality of geographical locations, and may include administration 134, a firewall 138A, an appliance 140A, server 142A, network devices 148A-B, clients 144A-D, such as protected by computer security facilities 152, and the like. The threat management facility 100 may include a plurality of functions, such as security management facility 122, policy management facility 112, update facility 120, definitions facility 114, network access rules facility 124, remedial action facility 128, detection techniques facility 130, testing facility 118, threat research facility 132, and the like. In embodiments, the threat protection provided by the threat management facility 100 may extend beyond the network boundaries of the enterprise facility 102 to include client facilities 144D that have moved into network connectivity not directly associated or controlled by the enterprise facility 102. Threats to client facilities 144 may come from a plurality of sources, such as from network threats 104, physical proximity threats 110, secondary location threats 108, and the like. Clients 144 may be protected from threats even when the client 144 is not located in association with the enterprise 102, such as when a client 144E-F moves in and out of the enterprise 102 such as interfacing with an unprotected server 142C through the Internet 154, when a client 144F is moving into a secondary location threat 108 such as interfacing with components 136B, 142B, 148C, 148D that are not protected, and the like. In embodiments, the threat management facility 100 may provide an enterprise facility 102 protection from a plurality of threats to multiplatform computer resources in a plurality of locations and network configurations, with an integrated system approach.

In embodiments, the threat management facility 100 may be provided as a stand-alone solution. In other embodiments, the threat management facility 100 may be integrated into a third-party product. An application programming interface (e.g. a source code interface) may be provided such that the threat management facility 100 may be integrated. For instance, the threat management facility 100 may be stand-alone in that it provides direct threat protection to an enterprise or computer resource, where protection is subscribed to directly 100. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may include a plurality of elements that provide protection from malware to enterprise facility 102 computer resources, including endpoint security and control, email security and control, web security and control, reputation-based filtering, control of unauthorized users, control of guest and non-compliant computers, and the like. The security management facility 122 may be a software application that may provide malicious code and malicious application protection to a client facility 144 computing resource. The security management facility 122 may have the ability to scan the client facility 144 files for malicious code, remove or quarantine certain applications and files, prevent certain actions, perform remedial actions and perform other security measures. In embodiments, scanning the client facility 144 may include scanning some or all of the files stored to the client facility 144 on a periodic basis, may scan applications once the application has been requested to execute, may scan files as the files are transmitted to or from the client facility 144, or the like. The scanning of the applications and files may be to detect known malicious code or known unwanted applications. In an embodiment, new malicious code and unwanted applications may be continually developed and distributed, and updates to the known code database may be provided on a periodic basis, on a demand basis, on an alert basis, or the like.

In an embodiment, the security management facility 122 may provide for email security and control, where security management may help to eliminate spam, viruses, spyware and phishing, control of email content, and the like. The security management facility's 122 email security and control may protect against inbound and outbound threats, protect email infrastructure, prevent data leakage, provide spam filtering, and the like. In an embodiment, security management facility 122 may provide for web security and control, where security management may help to detect or block viruses, spyware, malware, unwanted applications, help control web browsing, and the like, which may provide comprehensive web access control enabling safe, productive web browsing. Web security and control may provide internet use policies, reporting on suspect devices, security and content filtering, active monitoring of network traffic, URI filtering, and the like. In an embodiment, the security management facility 122 may provide for network access control, which may provide control over network connections. Network control may stop unauthorized, guest, or non-compliant systems from accessing networks, and may control network traffic that may not be bypassed from the client level. In addition, network access control may control access to virtual private networks (VPN), where VPNs may be a communications network tunneled through another network, establishing a logical connection acting as a virtual network. In embodiments, a VPN may be treated in the same manner as a physical network.

In an embodiment, the security management facility 122 may provide for host intrusion prevention through behavioral based protection, which may guard against unknown threats by analyzing behavior before software code executes. Behavioral based protection may monitor code when it runs and intervene if the code is deemed to be suspicious or malicious. Advantages of behavioral based protection over runtime protection may include code being prevented from running, whereas runtime protection may only interrupt code that has already partly executed; behavioral protection may identify malicious code at the gateway or on the file servers and deletes it before reaching end-point computers and the like.

In an embodiment, the security management facility 122 may provide for reputation filtering, which may target or identify sources of known malware. For instance, reputation filtering may include lists of URIs of known sources of malware or known suspicious IP addresses, or domains, say for spam, that when detected may invoke an action by the threat management facility 100, such as dropping them immediately. By dropping the source before any interaction can initiate, potential threat sources may be thwarted before any exchange of data can be made.

In embodiments, information may be sent from the enterprise back to a third party, a vendor, or the like, which may lead to improved performance of the threat management facility 100. For example, the types, times, and number of virus interactions that a client experiences may provide useful information for the preventions of future virus threats. This type of feedback may be useful for any aspect of threat detection. Feedback of information may also be associated with behaviors of individuals within the enterprise, such as being associated with most common violations of policy, network access, unauthorized application loading, unauthorized external device use, and the like. In embodiments, this type of information feedback may enable the evaluation or profiling of client actions that are violations of policy that may provide a predictive model for the improvement of enterprise policies.

In an embodiment, the security management facility 122 may provide for the overall security of the enterprise facility 102 network or set of enterprise facility 102 networks, may provide updates of malicious code information to the enterprise facility 102 network, and associated client facilities 144. The updates may be a planned update, an update in reaction to a threat notice, an update in reaction to a request for an update, an update based on a search of known malicious code information, or the like. The administration facility 134 may provide control over the security management facility 122 when updates are performed. The updates may be automatically transmitted without an administration facility's 134 direct control, manually transmitted by the administration facility 134, or the like. The security management facility 122 may include the management of receiving malicious code descriptions from a provider, distribution of malicious code descriptions to enterprise facility 102 networks, distribution of malicious code descriptions to client facilities 144, or the like. In an embodiment, the management of malicious code information may be provided to the enterprise facility's 102 network, where the enterprise facility's 102 network may provide the malicious code information through the enterprise facility's 102 network distribution system.

The threat management facility 100 may provide a policy management facility 112 that may be able to block non-malicious applications, such as VoIP 164, instant messaging 162, peer-to-peer file-sharing, and the like, that may undermine productivity and network performance within the enterprise facility 102. The policy management facility 112 may be a set of rules or policies that may indicate enterprise facility 102 access permissions for the client facility 144, such as access permissions associated with the network, applications, external computer devices, and the like. The policy management facility 112 may include a database, a text file, a combination of databases and text files, or the like. In an embodiment, a policy database may be a block list, a black list, an allowed list, a white list, or the like that may provide a list of enterprise facility 102 external network locations/applications that may or may not be accessed by the client facility 144. The policy management facility 112 may include rules that may be interpreted with respect to an enterprise facility 102 network access request to determine if the request should be allowed. The rules may provide a generic rule for the type of access that may be granted; the rules may be related to the policies of an enterprise facility 102 for access rights for the enterprise facility's 102 client facility 144. For example, there may be a rule that does not permit access to sporting websites. When a website is requested by the client facility 144, a security facility may access the rules within a policy facility to determine if the requested access is related to a sporting website. In an embodiment, the security facility may analyze the requested website to determine if the website matches with any of the policy facility rules.

The policy management facility 112 may be similar to the security management facility 122 but with the addition of enterprise facility 102 wide access rules and policies that may be distributed to maintain control of client facility 144 access to enterprise facility 102 network resources. The policies may be defined for application type, subset of application capabilities, organization hierarchy, computer facility type, user type, network location, time of day, connection type, or the like. Policies may be maintained by the administration facility 134, through the threat management facility 100, in association with a third party, or the like. For example, a policy may restrict IM 162 activity to only support personnel for communicating with customers. This may allow communication for departments requiring access, but may maintain the network bandwidth for other activities by restricting the use of IM 162 to only the personnel that need access to IM 162 in support of the enterprise facility 102. In an embodiment, the policy management facility 112 may be a stand-alone application, may be part of the network server facility 142, may be part of the enterprise facility 102 network, may be part of the client facility 144, or the like.

In embodiments, the threat management facility 100 may provide configuration management, which may be similar to policy management, but may specifically examine the configuration set of applications, operating systems, hardware, and the like, and managing changes to their configurations. Assessment of a configuration may be made against a standard configuration policy, detection of configuration changes, remediation of improper configuration, application of new configurations, and the like. An enterprise may keep a set of standard configuration rules and policies which may represent the desired state of the device. For example, a client firewall may be running and installed, but in the disabled state, where remediation may be to enable the firewall. In another example, the enterprise may set a rule that disallows the use of USB disks, and sends a configuration change to all clients, which turns off USB drive access via a registry.

In embodiments, the threat management facility 100 may also provide for the removal of applications that may interfere with the operation of the threat management facility 100, such as competitor products that may also be attempting similar threat management functions. The removal of such products may be initiated automatically whenever such products are detected. In the case where such applications are services are provided indirectly through a third-party product, the application may be suspended until action is taken to remove or disable the third-party product's protection facility.

Threat management against a sometimes quickly evolving malware environment may require timely updates, and the update management facility 120 may be provided by the threat management facility 100. In addition, a policy management facility 112 may also require update management (e.g. as provided by the update facility 120 herein described), as the enterprise facility 102 requirements for policies change enterprise facility 102, client facility 144, server facility 142 enterprise facility 102. The update management for the security facility 122 and policy management facility 112 may be provided directly by the threat management facility 100, such as by a hosted system or in conjunction with the administration facility 134. In embodiments, the threat management facility 100 may provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or client facility 144, the enterprise facility 102 network and/or client facility 144 may pull information from the security facility 122 and policy management facility 112 network server facilities 142, there may be a combination of pushing and pulling of information between the security facility 122 and the policy management facility 112 network servers 142, enterprise facility 102 network, and client facilities 144, or the like. For example, the enterprise facility 102 network and/or client facility 144 may pull information from the security facility 122 and policy management facility 112 network server facility 142 may request the information using the security facility 122 and policy management facility 112 update module; the request may be based on a certain time period, by a certain time, by a date, on demand, or the like. In another example, the security facility 122 and policy management facility 112 network servers 142 may push the information to the enterprise facility's 102 network and/or client facility 144 by providing notification that there are updates available for download and then transmitting the information. The combination of the security management 122 network server facility 142 and security update module may function substantially the same as the policy management facility 112 network server and policy update module by providing information to the enterprise facility 102 network and the client facility 144 in a push or pull method. In an embodiment, the policy management facility 112 and the security facility 122 management update modules may work in concert to provide all the needed information to the enterprise facility's 102 network and/or client facility 144 for control of application execution. In an embodiment, the policy update module and security update module may be combined into a single update module.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The virus identity (IDE) definition files may provide information that may identify malicious code within files, applications, or the like. The definition files may be accessed by security management facility 122 when scanning files or applications within the client facility 144 for the determination of malicious code that may be within the file or application. The definition files may contain a number of commands, definitions, or instructions, to be parsed and acted upon, or the like. In embodiments, the client facility 144 may be updated with new definition files periodically to provide the client facility 144 with the most recent malicious code definitions; the updating may be performed on a set time period, may be updated on demand from the client facility 144, may be updated on demand from the network, may be updated on a received malicious code alert, or the like. In an embodiment, the client facility 144 may request an update to the definition files from an update facility 120 within the network, may request updated definition files from a computing facility external to the network, updated definition files may be provided to the client facility 114 from within the network, definition files may be provided to the client facility 144 from an external computing facility from an external network, or the like.

In an embodiment, a definition management facility 114 may provide for the timely updates of definition files information to the network, client facilities 144, and the like. New and altered malicious code and malicious applications may be continually created and distributed to networks worldwide. The definition files that maintain the definitions of the malicious code and malicious application information for the protection of the networks and client facilities 144 may need continual updating to provide continual defense of the network and client facility 144 from the malicious code and malicious applications. The definition files management may provide for automatic and manual methods of updating the definition files. In embodiments, the network may receive definition files and distribute the definition files to the network client facilities 144, the client facilities 144 may receive the definition files directly, or the network and client facilities 144 may both receive the definition files, or the like. In an embodiment, the definition files may be updated on a fixed periodic basis, on demand by the network and/or the client facility 144, as a result of an alert of a new malicious code or malicious application, or the like. In an embodiment, the definition files may be released as a supplemental file to an existing definition files to provide for rapid updating of the definition files.

In a similar manner, the security management facility 122 may be used to scan an outgoing file and verify that the outgoing file is permitted to be transmitted per the enterprise facility 102 rules and policies. By checking outgoing files, the security management facility 122 may be able discover malicious code infected files that were not detected as incoming files as a result of the client facility 144 having been updated with either new definition files or policy management facility 112 information. The definition files may discover the malicious code infected file by having received updates of developing malicious code from the administration facility 134, updates from a definition files provider, or the like. The policy management facility 112 may discover the malicious code infected file by having received new updates from the administration facility 134, from a rules provider, or the like.

The threat management facility 100 may provide for a way to control access to the enterprise facility 102 networks. For instance, the enterprise facility 102 may want to restrict access to certain applications, networks, files, printers, servers, databases, or the like. In addition, the enterprise facility 102 may want to restrict user access under certain conditions, such as the user's location, usage history, need to know, job position, connection type, time of day, method of authentication, client-system configuration, or the like. Network access rules may be developed by the enterprise facility 102, or pre-packaged by a supplier, and managed by the threat management facility 100 in conjunction with the administration facility 134. Network access rules and control may be responsible for determining if a client facility 144 application should be granted access to a requested network location. The network location may be on the same network as the facility or may be on another network. In an embodiment, the network access control may verify access rights for client facilities 144 from within the network or may verify access rights of computer facilities from external networks. When network access for a client facility 144 is denied, the network access control may send an information file to the client facility 144, the information file may contain data or commands that may provide instructions for the remedial action facility 128. The information sent by the network access facility 124 control may be a data file. The data file may contain a number of commands, definitions, instructions, or commands to be parsed and acted upon through the remedial action facility 128, or the like. The information sent by the network access facility 124 control may be a command or command file that the remedial action facility 128 may access and take action upon.

In an embodiment, the network access rules 124 may provide an information store to be accessed by the network access control. The network access rules facility 124 may include databases such as a block list, a black list, an allowed list, a white list, an unacceptable network site database, an acceptable network site database, a network site reputation database, or the like of network access locations that may or may not be accessed by the client facility 144. Additionally, the network access rules facility 124 may incorporate rule evaluation; the rule evaluation may parse network access requests and apply the parsed information to network access rules. The network access rule facility 124 may have a generic set of rules that may be in support of an enterprise facility's 102 network access policies, such as denying access to certain types of websites 158, controlling instant messenger 162 accesses, or the like. Rule evaluation may include regular expression rule evaluation, or other rule evaluation method for interpreting the network access request and comparing the interpretation to the established rules for network access. In an embodiment, the network access rules facility 124 may receive a rules evaluation request from the network access control and may return the rules evaluation to the network access control.

Similar to the threat definitions facility 114, the network access rule facility 124 may provide updated rules and policies to the enterprise facility 102. The network access rules facility 124 may be maintained by the network administration facility 134, using network access rules facility 124 management. In an embodiment, the network administration facility 134 may be able to maintain a set of access rules manually by adding rules, changing rules, deleting rules, or the like. Additionally, the administration facility 134 may be able to retrieve predefined rule sets from a provider that may provide a set of rules to be applied to an entire enterprise facility 102. The network administration facility 134 may be able to modify the predefined rules as needed for a particular enterprise facility 102 using the network access rules management facility 124.

When a threat or policy violation is detected by the threat management facility 100, the threat management facility 100 may provide for a remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, record interactions for subsequent evaluation, or the like. Remedial action may be associated with an application that responds to information that a client facility 144 network access request has been denied. In an embodiment, when the data file is received, remedial action may parse the data file, interpret the various aspects of the data file, and act on the parsed data file information to determine actions to be taken on an application requesting access to a denied network location. In an embodiment, when the data file is received, remedial action may access the threat definitions to parse the data file and determine an action to be taken on an application requesting access to a denied network location. In an embodiment, the information received from the facility may be a command or a command file. The remedial action facility may carry out any commands that are received or parsed from a data file from the facility without performing any interpretation of the commands. In an embodiment, the remedial action facility may interact with the received information and may perform various actions on a client requesting access to a denied network location. The action may be one or more of continuing to block all requests to a denied network location, a malicious code scan on the application, a malicious code scan on the client facility 144, quarantine of the application, terminating the application, isolation of the application, isolation of the client facility 144 to a location within the network that restricts network access, blocking a network access port from a client facility 144, reporting the application to a administration facility 134, or the like.

Remedial action may be provided as a result of a detection of a threat or violation. The detection techniques facility 130 may include monitoring the enterprise facility 102 network or end-point devices, such as by monitoring streaming data through the gateway, across the network, through routers and hubs, and the like. The detection techniques facility 130 may include monitoring activity and stored files on computing facilities, such as on server facilities 142, desktop computers, laptop computers, other mobile computing devices, and the like. Detection techniques, such as scanning a computer's stored files, may provide the capability of checking files for stored threats, either in the active or passive state. Detection techniques, such as streaming file management, may provide the capability of checking files received at the network, gateway facility, client facility 144, and the like. This may provide the capability of not allowing a streaming file or portions of the streaming file containing malicious code from entering the client facility 144, gateway facility, or network. In an embodiment, the streaming file may be broken into blocks of information, and a plurality of virus identities may be used to check each of the blocks of information for malicious code. In an embodiment, any blocks that are not determined to be clear of malicious code may not be delivered to the client facility 144, gateway facility, or network.

Verifying that the threat management facility 100 is detecting threats and violations to established policy, may require the ability to test the system, either at the system level or for a particular computing component. The testing facility 118 may allow the administration facility 134 to coordinate the testing of the security configurations of client facility 144 computing facilities on a network. The administration facility 134 may be able to send test files to a set of client facility 144 computing facilities to test the ability of the client facility 144 to determine acceptability of the test file. After the test file has been transmitted, a recording facility may record the actions taken by the client facility 144 in reaction to the test file. The recording facility may aggregate the testing information from the client facility 144 and report the testing information to the administration facility 134. The administration facility 134 may be able to determine the level of preparedness of the client facility 144 computing facilities by the reported information. Remedial action may be taken for any of the client facility 144 computing facilities as determined by the administration facility 134; remedial action may be taken by the administration facility 134 or by the user of the client facility 144.

The threat research facility 132 may provide a continuously ongoing effort to maintain the threat protection capabilities of the threat management facility 100 in light of continuous generation of new or evolved forms of malware. Threat research may include researchers and analysts working on known and emerging malware, such as viruses, rootkits a spyware, as well as other computer threats such as phishing, spam, scams, and the like. In embodiments, through threat research, the threat management facility 100 may be able to provide swift, global responses to the latest threats.

The threat management facility 100 may provide threat protection to the enterprise facility 102, where the enterprise facility 102 may include a plurality of networked components, such as client facility 144, server facility 142, administration facility 134, firewall 138, gateway, hubs and routers 148, threat management appliance 140, desktop users, mobile users, and the like. In embodiments, it may be the end-point computer security facility 152, located on a computer's desktop, which may provide threat protection to a user, and associated enterprise facility 102. In embodiments, the term end-point may refer to a computer system that may source data, receive data, evaluate data, buffer data, or the like (such as a user's desktop computer as an end-point computer), a firewall as a data evaluation end-point computer system, a laptop as a mobile end-point computer, a PDA as a hand-held end-point computer, a mobile phone as an end-point computer, or the like. In embodiments, end-point may refer to a source or destination for data, including such components where the destination is characterized by an evaluation point for data, and where the data may be sent to a subsequent destination after evaluation. The end-point computer security facility 152 may be an application loaded onto the computer platform or computer support component, where the application may accommodate the plurality of computer platforms and/or functional requirements of the component. For instance, a client facility 144 computer may be one of a plurality of computer platforms, such as Windows, Macintosh, Linux, and the like, where the end-point computer security facility 152 may be adapted to the specific platform, while maintaining a uniform product and product services across platforms. Additionally, components may have different functions to serve within the enterprise facility's 102 networked computer-based infrastructure. For instance, computer support components provided as hubs and routers 148, server facility 142, firewalls 138, and the like, may require unique security application software to protect their portion of the system infrastructure, while providing an element in an integrated threat management system that extends out beyond the threat management facility 100 to incorporate all computer resources under its protection.

The enterprise facility 102 may include a plurality of client facility 144 computing platforms on which the end-point computer security facility 152 is adapted. A client facility 144 computing platform may be a computer system that is able to access a service on another computer, such as a server facility 142, via a network. This client facility 144 server facility 142 model may apply to a plurality of networked applications, such as a client facility 144 connecting to an enterprise facility 102 application server facility 142, a web browser client facility 144 connecting to a web server facility 142, an e-mail client facility 144 retrieving e-mail from an internet 154 service provider's mail storage servers 142, and the like. In embodiments, traditional large client facility 144 applications may be switched to websites, which may increase the browser's role as a client facility 144. Clients 144 may be classified as a function of the extent to which they perform their own processing. For instance, client facilities 144 are sometimes classified as a fat client facility 144 or thin client facility 144. The fat client facility 144, also known as a thick client facility 144 or rich client facility 144, may be a client facility 144 that performs the bulk of data processing operations itself, and does not necessarily rely on the server facility 142. The fat client facility 144 may be most common in the form of a personal computer, where the personal computer may operate independent of any server facility 142. Programming environments for fat clients 144 may include CURT, Delphi, Droplets, Java, win32, X11, and the like. Thin clients 144 may offer minimal processing capabilities, for instance, the thin client facility 144 may primarily provide a graphical user interface provided by an application server facility 142, which may perform the bulk of any required data processing. Programming environments for thin clients 144 may include JavaScript/AJAX, ASP, JSP, Ruby on Rails, Python's Django, PHP, and the like. The client facility 144 may also be a mix of the two, such as processing data locally, but relying on a server facility 142 for data storage. As a result, this hybrid client facility 144 may provide benefits from both the fat client facility 144 type, such as multimedia support and high performance, and the thin client facility 144 type, such as high manageability and flexibility. In embodiments, the threat management facility 100, and associated end-point computer security facility 152, may provide seamless threat protection to the plurality of clients 144, and client facility 144 types, across the enterprise facility 102.

A computer, such as the end-point client 144, server 142, and the like, may be a physical computing machine, that is, it may act as a single processing entity, where there is a single operating system on the machine, and which has all of the physical resources of the physical machine available for its use. However, a computer may also be partitioned or multiplexed into a plurality of virtual computing machines, such as where each virtual computing machine runs its own operating system. One of the reasons for implementing a virtual computing machine configuration is to establish multiple isolated virtual machines on a single hardware platform, such as for running a plurality of client virtual machines on a server, for quality of service offered to different enterprise customer servers operating on the same physical server 142, the ability to run different types of operating systems on a single platform, providing a unique instruction set architecture to one virtual machine verses another, and the like. In embodiments, a plurality of virtual computing machines configured on a single physical computing machine may each have their own copies of the end-point computer security facility 152, such as all running on the same physical computing machine, distributed amongst at least two computing machines, and the like.

The enterprise facility 102 may include a plurality of server facilities 142, such as application servers, communications servers, file servers, database servers, proxy servers, mail servers, fax servers, game servers, web servers, and the like. A server facility 142, which may also be referred to as a server facility 142 application, server facility 142 operating system, server facility 142 computer, or the like, may be an application program or operating system that accepts client facility 144 connections in order to service requests from clients 144. The server facility 142 application may run on the same computer as the client facility 144 using it, or the server facility 142 and the client facility 144 may be running on different computers and communicating across the network. Server facility 142 applications may be divided among server facility 142 computers, with the dividing depending upon the workload. For instance, under light load conditions all server facility 142 applications may run on a single computer and under heavy load conditions a single server facility 142 application may run on multiple computers. In embodiments, the threat management facility 100 may provide threat protection to server facilities 142 within the enterprise facility 102 as load conditions and application changes are made.

A server facility 142 may also be an appliance facility 140, where the appliance facility 140 provides specific services onto the network. Though the appliance facility 140 is a server facility 142 computer, that may be loaded with a server facility 142 operating system and server facility 142 application, the enterprise facility 102 user may not need to configure it, as the configuration may have been performed by a third party. In an embodiment, an enterprise facility 102 appliance may be a server facility 142 appliance that has been configured and adapted for use with the threat management facility 100, and located within the facilities of the enterprise facility 102. The enterprise facility's 102 threat management appliance may enable the enterprise facility 102 to administer an on-site local managed threat protection configuration, where the administration facility 134 may access the threat resources through an interface, such as a web portal. In an alternate embodiment, the enterprise facility 102 may be managed remotely from a third party, vendor, or the like, without an appliance facility 140 located within the enterprise facility 102. In this instance, the appliance functionality may be a shared hardware product between pluralities of enterprises 102. In embodiments, the appliance facility 140 may be located at the enterprise facility 102, where the enterprise facility 102 maintains a degree of control. In embodiments, a hosted service may be provided, where the appliance 140 may still be an on-site black box to the enterprise facility 102, physically placed there because of infrastructure requirements, but managed by a third party, vendor, or the like.

Simple server facility 142 appliances may also be utilized across the enterprise facility's 102 network infrastructure, such as switches, routers, wireless routers, hubs and routers, gateways, print servers, net modems, and the like. These simple server facility appliances may not require configuration by the enterprise facility 102, but may require protection from threats via an end-point computer security facility 152. These appliances may provide interconnection services within the enterprise facility 102 network, and therefore may advance the spread of a threat if not properly protected.

One way for a client facility 144 to be protected from threats from within the enterprise facility 102 network may be a personal firewall. A personal firewall may be an application that controls network traffic to and from a client, permitting or denying communications based on a security policy. Personal firewalls may be designed for use by end-users, which may result in protection for only the computer on which it's installed. Personal firewalls may be able to control network traffic by providing prompts each time a connection is attempted and adapting security policy accordingly. Personal firewalls may also provide some level of intrusion detection, which may allow the software to terminate or block connectivity where it suspects an intrusion is being attempted. Other features that may be provided by a personal firewall may include alerts about outgoing connection attempts, control of program access to networks, hiding the client from port scans by not responding to unsolicited network traffic, monitoring of applications that may be listening for incoming connections, monitoring and regulation of incoming and outgoing network traffic, prevention of unwanted network traffic from installed applications, reporting applications that make connection attempts, reporting destination servers with which applications may be attempting communications, and the like. In embodiments, the personal firewall may be provided by the threat management facility 100.

Another important component that may be protected by an end-point computer security facility 152 is a network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a low level of trust is the Internet 154, because the source of data may be unknown. A zone with an intermediate trust level, situated between the Internet 154 and a trusted internal network, may be referred to as a "perimeter network". Since firewall facilities 138 represent boundaries between threat levels, the end-point computer security facility 152 associated with the firewall facility 138 may provide resources that may control the flow of threats at this enterprise facility 102 network entry point. Firewall facilities 138, and associated end-point computer security facility 152, may also be associated with a network node that may be equipped for interfacing between networks that use different protocols. In embodiments, the end-point computer security facility 152 may provide threat protection in a plurality of network infrastructure locations, such as at the enterprise facility 102 network entry point, i.e. the firewall facility 138 or gateway; at the server facility 142; at distribution points within the network, i.e. the hubs and routers 148; at the desktop of client facility 144 computers; and the like. In embodiments, the most effective location for threat detection may be at the user's computer desktop end-point computer security facility 152.

The interface between the threat management facility 100 and the enterprise facility 102, and through the appliance facility 140 to embedded end-point computer security facilities, may include a set of tools that may be the same for all enterprise implementations, but allow each enterprise to implement different controls. In embodiments, these controls may include both automatic actions and managed actions. Automatic actions may include downloads of the end-point computer security facility 152 to components of the enterprise facility 102, downloads of updates to existing end-point computer security facilities of the enterprise facility 102, uploaded network interaction requests from enterprise facility 102 components to the threat management facility 100, and the like. In embodiments, automatic interactions between the enterprise facility 102 and the threat management facility 100 may be configured by the threat management facility 100 and an administration facility 134 in the enterprise facility 102. The administration facility 134 may configure policy rules that determine interactions, such as developing rules for accessing applications, as in who is authorized and when applications may be used; establishing rules for ethical behavior and activities; rules governing the use of entertainment software such as games, or personal use software such as IM 162 and VoIP 164; rules for determining access to enterprise facility 102 computing resources, including authentication, levels of access, risk assessment, and usage history tracking; rules for when an action is not allowed, such as whether an action is completely deigned or just modified in its execution; and the like. The administration facility 134 may also establish license management, which in turn may further determine interactions associated with a licensed application. In embodiments, interactions between the threat management facility 100 and the enterprise facility 102 may provide threat protection to the enterprise facility 102 by managing the flow of network data into and out of the enterprise facility 102 through automatic actions that may be configured by the threat management facility 100 or the administration facility 134.

Client facilities 144 within the enterprise facility 102 may be connected to the enterprise facility 102 network by way of wired network facilities 148A or wireless network facilities 148B. Client facilities 144 connected to the enterprise facility 102 network via a wired facility 148A or wireless facility 148B may receive similar protection, as both connection types are ultimately connected to the same enterprise facility 102 network, with the same end-point computer security facility 152, and the same threat protected enterprise facility 102 environment. Mobile wireless facility clients 144B-F, because of their ability to connect to any wireless 148B,D network access point, may connect to the internet 154 outside the enterprise facility 102, and therefore outside the threat-protected environment of the enterprise facility 102. In this instance the mobile client facility 144B-F, if not for the presence of the end-point computer security facility 152 may experience a malware attack or perform actions counter to enterprise facility 102 established policies. In addition, there may be a plurality of ways for the threat management facility 100 to protect the out-of-enterprise facility 102 mobile client facility 144D-F that has an embedded end-point computer security facility 152, such as by providing URI filtering in personal routers, using a web appliance as a DNS proxy, or the like. Mobile client facilities 144D-F that are components of the enterprise facility 102 but temporarily outside connectivity with the enterprise facility 102 network, may be provided with the same threat protection and policy control as client facilities 144 inside the enterprise facility 102. In addition, mobile client facilities 144B-F may receive the same interactions to and from the threat management facility 100 as client facilities 144 inside the enterprise facility 102, where mobile client facilities 144B-F may be considered a virtual extension of the enterprise facility 102, receiving all the same services via their embedded end-point computer security facility 152.

Interactions between the threat management facility 100 and the components of the enterprise facility 102, including mobile client facility 144B-F extensions of the enterprise facility 102, may ultimately be connected through the internet 154. Threat management facility 100 downloads and upgrades to the enterprise facility 102 may be passed from the firewalled networks of the threat management facility 100 through to the end-point computer security facility 152 equipped components of the enterprise facility 102. In turn the end-point computer security facility 152 components of the enterprise facility 102 may upload policy and access requests back across the internet 154 and through to the threat management facility 100. The Internet 154 however, is also the path through which threats may be transmitted from their source. These network threats may include threats from a plurality of sources, including websites 158, e-mail 160, IM 162, VoIP 164, application software, and the like. These threats may attempt to attack a mobile enterprise client facility 144B-F equipped with an end-point computer security facility 152, but in embodiments, as long as the mobile client facility 144B-F is embedded with an end-point computer security facility 152, as described above, threats may have no better success than if the mobile client facility 144B-F were inside the enterprise facility 102.

However, if the mobile client facility 144 were to attempt to connect into an unprotected connection point, such as at a secondary location 108 that is not a part of the enterprise facility 102, the mobile client facility 144 may be required to request network interactions through the threat management facility 100, where contacting the threat management facility 100 may be performed prior to any other network action. In embodiments, the client facility's 144 end-point computer security facility 152 may manage actions in unprotected network environments such as when the client facility 144F is in a secondary location 108 or connecting wirelessly to a non-enterprise facility 102 wireless internet connection, where the end-point computer security facility 152 may dictate what actions are allowed, blocked, modified, or the like. For instance, if the client facility's 144 end-point computer security facility 152 is unable to establish a secured connection to the threat management facility 100, the end-point computer security facility 152 may inform the user of such, and recommend that the connection not be made. In the instance when the user chooses to connect despite the recommendation, the end-point computer security facility 152 may perform specific actions during or after the unprotected connection is made, including running scans during the connection period, running scans after the connection is terminated, storing interactions for subsequent threat and policy evaluation, contacting the threat management facility 100 upon first instance of a secured connection for further actions and/or scanning, restricting access to network and local resources, or the like. In embodiments, the end-point computer security facility 152 may perform specific actions to remediate possible threat incursions or policy violations during or after the unprotected connection.

The secondary location 108 may have no end-point computer security facilities 152 as a part of its computer components, such as its firewalls 138B, servers 142B, clients 144G, hubs and routers 148C-D, and the like. As a result, the computer components of the secondary location 108 may be open to threat attacks, and become potential sources of threats, as well as any mobile enterprise facility clients 144B-F that may be connected to the secondary location's 108 network. In this instance, these computer components may now unknowingly spread a threat to other components connected to the network.

Some threats may not come directly from the Internet 154, such as from non-enterprise facility controlled mobile devices that are physically brought into the enterprise facility 102 and connected to the enterprise facility 102 client facilities 144. The connection may be made from direct connection with the enterprise facility's 102 client facility 144, such as through a USB port, or in physical proximity with the enterprise facility's 102 client facility 144 such that a wireless facility connection can be established, such as through a Bluetooth connection. These physical proximity threats 110 may be another mobile computing device, a portable memory storage device, a mobile communications device, or the like, such as CDs and DVDs 170, memory stick 174, flash drive 174, external hard drive, cell phone 178, PDAs 180, MP3 players, digital cameras, point-to-point devices, digital picture frames, digital pens, navigation devices, appliances, and the like. A physical proximity threat 110 may have been previously infiltrated by network threats while connected to an unprotected network connection outside the enterprise facility 102, and when connected to the enterprise facility 102 client facility 144, pose a threat. Because of their mobile nature, physical proximity threats 110 may infiltrate computing resources in any location, such as being physically brought into the enterprise facility 102 site, connected to an enterprise facility 102 client facility 144 while that client facility 144 is mobile, plugged into an unprotected client facility 144 at a secondary location 108, and the like. A mobile device, once connected to an unprotected computer resource, may become a physical proximity threat 110. In embodiments, the end-point computer security facility 152 may provide enterprise facility 102 computing resources with threat protection against physical proximity threats 110, for instance, through scanning the device prior to allowing data transfers, through security validation certificates, through establishing a safe zone within the enterprise facility 102 computing resource to transfer data into for evaluation, and the like.

Now that the overall system has been described, we turn towards a set of local software update embodiments. It should be understood that the following embodiments may be managed through a threat management facility 100 along with other services, such as those described herein.

Updates to Local Machines:

Software updates to client computers that are local to one another may have significant similarity in the updates that are required, such as updates to application software, threat management updates 120, updates to security management 122 software, updates to the computer's operating system, updates in the form of patches, updates to game software, and the like. For example, and referring to FIG. 1, client computers 144A, 144B, and 144C may be located on the same network or sub-network in an enterprise 102, and have very similar application software, threat management software, operating system version, and the like. Providing software updates to each machine by direct download may require the utilization of significant network resources, especially if the number of client computers is large. In the case of a group of local client computers that have similar update needs, the software update downloads may be highly redundant. That is, each client computer may be downloading much of the same software updates. The present invention may provide for methods and systems that utilize significantly lower network resources for the case where updates are common to a number of local computers. In the present invention, downloads may be broken down into sub-file update files, sent to at least one local machine, and then further distributed by the at least one local machine to the remaining local machines through broadcast packets. Thus, the network utilization for downloading across the network is limited to the download to the at least one local machine. A benefit to this configuration includes the elapsed time to update a group of computers not substantially changing when the number of computers increases. For example, updating 100 computers may not take longer than updating 10 computers. In embodiments, the download to the at least one local machine may be the entire software update, where the at least one local machine then divides the software update into sub-file update files for broadcasting to the remaining local machines through broadcast packets. In embodiments, the software update may be delivered to the at least one local machine by means other than through the network, such as through a mobile storage device connected through a USB port (e.g. an external hard drive, a thumb drive).

In an example embodiment, and continuing to refer to FIG. 1, a server 142A may contain software updates for clients 144A, 144B, and 144C. The server 142A may send out a message to the clients that describes a software update, including information describing each of a plurality of sub-files that when taken together make up the software update. In this example, the client computer 144A responds to the server with a request for the first sub-file data, and the server provides a download of the sub-file to client computer 144A, which stores the sub-file in local cache for later assembling when it has all the sub-files for the update. Now, with one of the local client computers 144A having the first of the sub-files, it broadcasts the sub-file to the other local client computers, in this case 144B and 144C, but in the more general case to a plurality of local client computers. This process continues until all the computers have all the sub-files, at which point each client computer may reassemble the full update file. In this scenario, direct downloads were restricted to a single client computer and the rest received the sub-files via local broadcast packets. Thus, network usage efficiency due to transmitting the update to the client computers has been increased, with the effect further increasing as the number of local computers increases.

In embodiments, the present invention may be utilized for data transfer applications other than software updates, such as for any data transfer that is being distributed to a plurality of local computers. For example, the present invention may be used to transfer a media file to a plurality of end-point machines, such as a company-wide presentation, video, multimedia event, and the like. For instance, the media may be transferred ahead of time, and then enabled or triggered for activation at a common time for everyone in the company. One skilled in the art will understand how the current invention could be applied to many different data file distribution applications, as well as to different computing facilities. For instance, the plurality of clients 212 may include a computer, laptop computer, mobile phone, set-top boxes, entertainment facilities, and the like.

Figure 2:
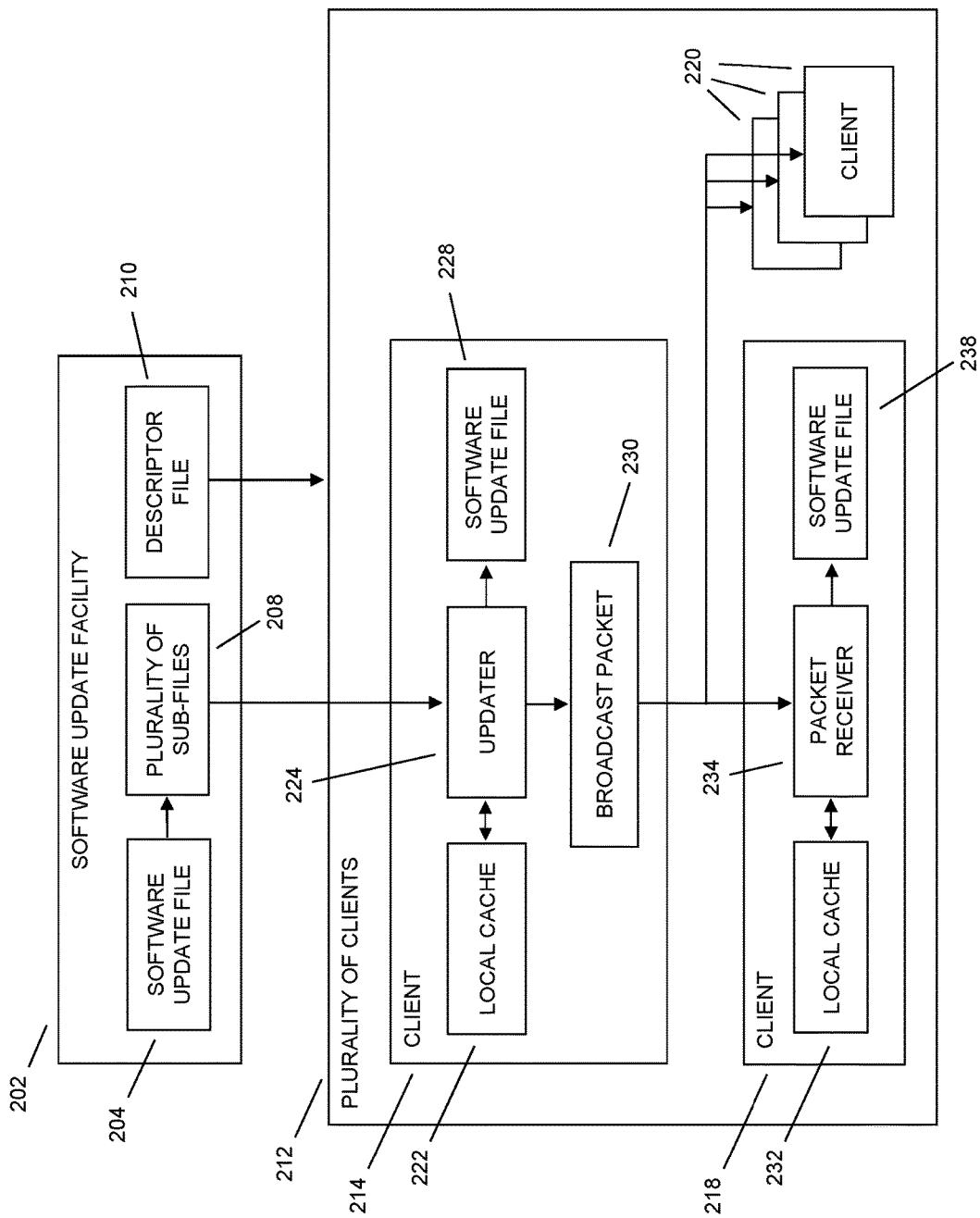
FIG. 2 depicts a top-level block diagram of an embodiment of the present invention.

In embodiments, and referring to FIG. 2, a software update facility 202 may be provided (e.g., on a server 142A) with a software update file 204 for distribution to a plurality of clients 212. The software update file 204 may be divided into a plurality of software update sub-files 204, where a descriptor file 210 may be provided that describes the software update file 204, including a security hash for each sub-file 208 of the software update file 204. The description information for the software update file in the descriptor file 210 may include the type of client machine to update, the target software for the update (e.g. the application, operating system, game, threat management facility), and the like. Note that the division of the software update file 204 into sub-files 204, as well as the generation of the hash for each sub-file 208, may be provided by the software update facility 202, or some external facility, such as an updates facility 120 for threat management, an updates facility for client software updates, and the like. When the software update facility 202 is ready to begin the process of distributing the software update to the plurality of clients 212, it may enable the transmission of the description file 210 to at least one of the plurality of clients 214, at which time the client 214 begins the updater process. In embodiments, the software update facility 202 may provide the software update file 204 to the at least one of the plurality of clients 214 for the division of the software update file 204 into sub-files.

Figure 3:
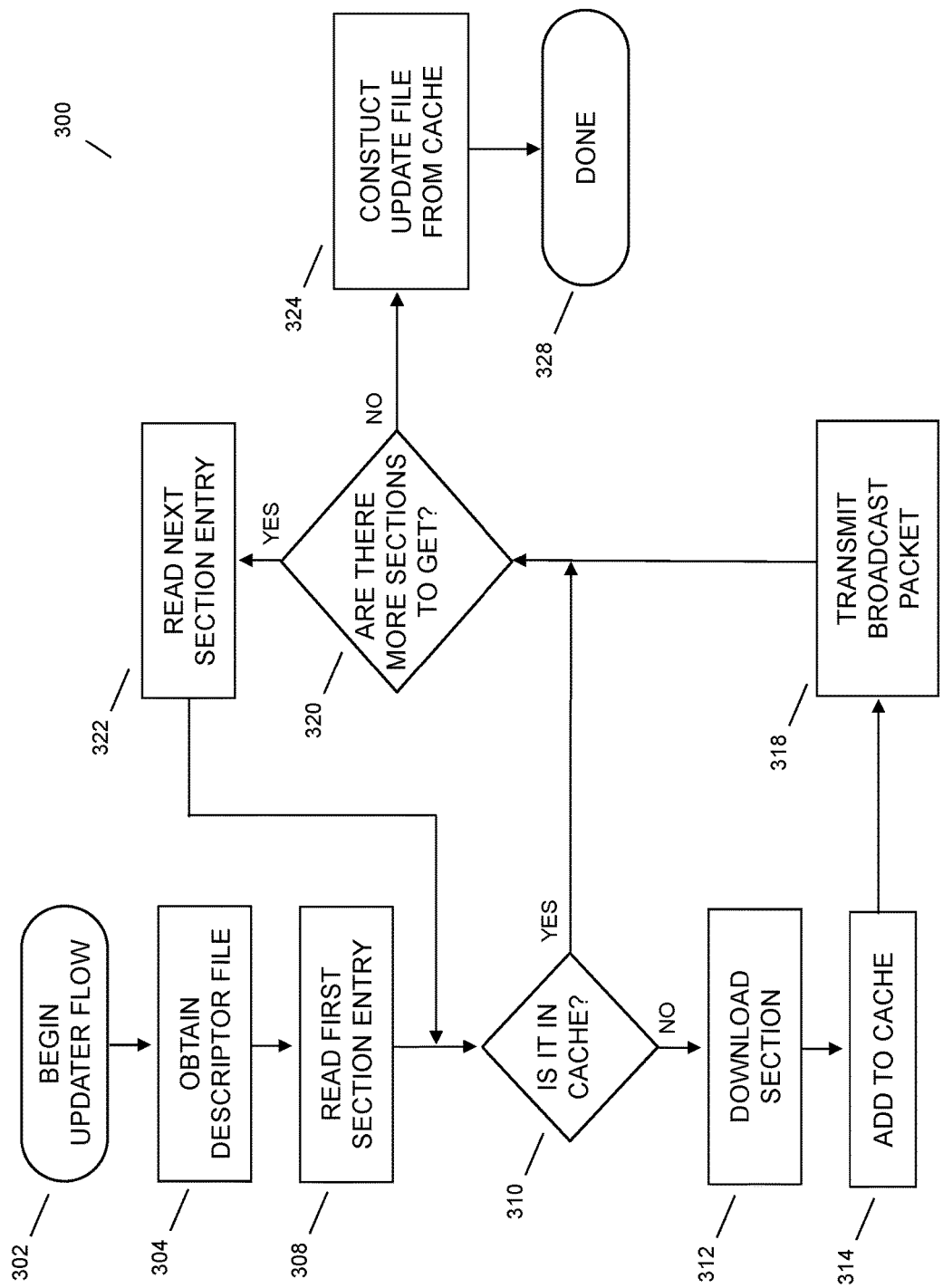
FIG. 3 depicts a flow diagram for the updater process, in an embodiment of the present invention.

Each of the plurality of clients 212 may be capable of executing the updater process, but only one client 214 may be required to execute the updater process for the rest of the plurality of clients 218, 220. As such, each of the plurality of clients 212 may have an updater processor 224 for executing the update process, a local cache 222 for storing sub-files 208 during the process (for eventual reassembly of the software update 228 for the client), but only one client 214 may be required to broadcast packets 230 containing sub-files to the other clients 218, 220. Referring to FIG. 3, the updater process flow 300 for the updater processor 224 is depicted, where the updater flow begins at a step 302 once the software update facility is ready with the plurality of update sub-files 208 and the descriptor file 210. In a first step 304, the client 214 obtains the descriptor file 210, which may be a direct download from the software update facility to the client, or any other data transfer method known to the art. In a next step 308, the client 214 may read the first section entry in the descriptor file, such as containing the hash for the first sub-file. In step 310, the client may check for whether the first section entry is already in local cache, such as from a previous download from this update process, from a previous update, from the original download of the software being updated, and the like. If the first section is not in the cache, step 312 downloads the section from the software update facility, and in step 314, adds the section to the local cache 222. In step 318, the updater processor formats and transmits a broadcast packet 230 to the other clients 218, 220 for use in their update process via the packet receiver 234 process, as described herein. After broadcasting, and in the instance where the section was already in the local cache, the process step 320 depicts the updater processor 224 examining the descriptor file again to determine if there is another section entry to read, and if yes, the update processor repeats steps 310-318, and if no, proceeds to step 324 to reconstruct the software update file 228 from the sections stored in the local cache 222, at which point the update process flow is done 328. The client now having reassembled the software update file may now execute the software update.

Figure 4:
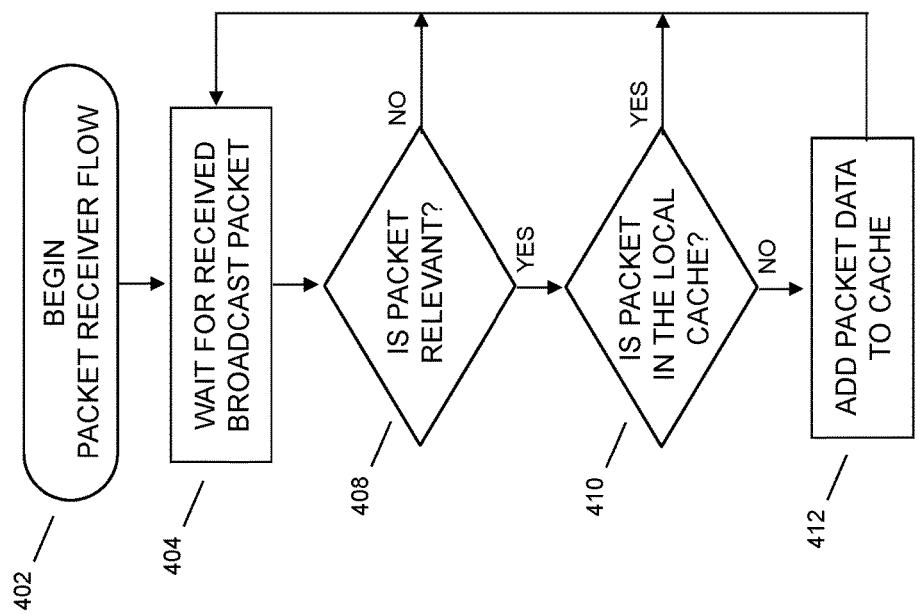
FIG. 4 depicts a flow diagram for the packet receiver process, in an embodiment of the present invention.

At this point in the update process, client 214 has completed the update process for itself, and broadcasted all of the sub-files 208 that it downloaded from the software update facility 202 to the remaining plurality of clients 218, 220. In addition, each of the other clients 218, 220 have independently received the descriptor file 210 from the software update facility 202. Referring to FIG. 4, step 402 begins the packet receiver flow process of the packet receiver processor 234. At step 404 the packet receiver processor 234 waits for a broadcast packet 230. At step 408 the packet receiver processor examines a broadcasted packet received in order to determine if the packet is relevant. If no, the process returns to step 404 to wait for another broadcasted packet. If yes, the process proceeds to step 410 to determine if the packet is already in the local cache. If the packet is already in the local cache, the process returns to step 404 to wait for another broadcasted packet. If no, then the section data included in the broadcasted packet is added to the local cache, and again, the packet receiver process flow returns to step 404 to wait for another broadcasted packet. When all of the packets are received by the other clients 218, 220 for a given software update, the software update file 238 is reassembled from the local cache, and the update to the client software executed.

In embodiments, each of the plurality of clients 212 may have an update processor 224, a packet receiver processor 234, both 224 and 234, only one of 224 and 234, and the like. The update processor 224 and packet receiver processor may be integrated into a single software update client processor. The packet receiver processor 234 and updater processor 224 may also include a mechanism for removing old entries from the local cache 222, 232. In embodiments, one of the plurality of clients 212 may be targeted as the client 214 to act as the local update controller for creating and transmitting broadcast packets 230 to the other clients 218, 220, or the software update facility may treat the plurality of clients 212 as equals with regard to what client will take over as the controller. For example, the software update facility 202 may transmit the descriptor file to the plurality of clients 212, and the first client to respond back becomes the controller.

In another example, multiple clients may become 'controllers', where the multiple of clients each may create and transmit packets to other clients of the plurality of clients 212. In this configuration, there is no 'master' or 'controller' as such, where each client acts independently to distribute the update content as obtained from the software update facility 202. As part of the process, a client stores the latest update, such as to make the update available to others for a prolonged time period, and may remember the multi-clients that have sent out broadcasts, so that it can request retransmit of a broadcast message.

In embodiments, clients may be able to share information, such as sections of data, hashes, a descriptor file, and the like, from other clients through peer-to-peer protocol. In embodiments, the configuration of how updates to the plurality of clients 212 may be controlled may be through a software update policy facility, through an administrator, controlled automatically per predetermined update configuration parameters, and the like.

In embodiments, the descriptor file 210 may be delivered in a secure manner, such as being digitally signed or through another secure alternative mechanism known in the art. In this way, the client may check the digital signature of the descriptor file, and reject it if it is not valid. As described herein, for each of the sub-file sections, the descriptor file may contain an entry containing a secure hash of the section of data. For example, the secure hash may be an SHA-25 hash, taking 32 bytes of storage. The section may also include a checksum, such as to enable difference-based updating. In embodiments, clients may encrypt broadcast packets (e.g., for delivery of confidential information), such as with an optional encryption salt in the descriptor file definition. Alternatively, an encryption key could automatically be determined by using the secure hash itself as a salt. For example, by Key=HMAC(Shared Key, Secure Hash).

In embodiments, the broadcast packet 230 may include a network header specifying the broadcast address, specific port, and the like. A unique identifier for the type of product may be included, such as an identifier for the software product being updated. In embodiments, the sub-files 208 may be broken into small sections that enable them to fit into a single broadcast packet, such as 1024 bytes in length, and the like, thus eliminating fragmentation. The broadcast packet 230 may include a secure hash for the data section, such as in an alternative to the client calculating the hash, thus providing a more efficient packet receiver process. The hash, such as included in the broadcast packet, descriptor file, and the like, may allow the updater to efficiently scan local files (e.g., older versions of the software) for sections which match those required, and avoid downloading the sections which it already has. This may also allow for a difference-based updating.

In embodiments, to improve network utilization a broadcast rate may be specified, such as a maximum broadcast rate. For instance, one application of a maximum broadcast rate may be where the broadcast rate is set to be very low, allowing computers to efficiently download updates over a long period of time to minimize impacts to network utilization. In addition, the updater processor may obtain sections in a random order, thus reducing the probability of two computers on the local network downloading the same section at the same time, which would be an unnecessary use of the network.

In embodiments, the local cache 222, 232 may store the sections of data received and store the sections indexed by the secure hash. The local cache may be stored on a local disk or other persistent storage. However, parts of the index may be kept in RAM for efficient checks of the contents. For instance, data processors that update the cache may aggregate updates into RAM or other fast storage before updating the cache, so that the small size of the section data does not cause efficiency problems.

The methods and systems described herein may be deployed in part or in whole through a machine that executes computer software, program codes, and/or instructions on a processor. The present invention may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A method of updating a threat management policy among computers in a local network, the method comprising:
   receiving a descriptor file at a first device of a plurality of local computing devices coupled in a communicating relationship to one another through a local network that supports broadcast communications, the descriptor file including a hash code for each of a plurality of update sub-files and indicating an order in which the plurality of update sub-files assemble into a threat management policy update;
   determining if the threat management policy update is relevant to a resident threat management policy on the first device based on matching an identifier for the threat management policy update contained in the descriptor file to an identifier for the resident threat management policy on the first device;
   if the threat management policy update is relevant to the resident threat management policy on the first device, determining that one of the plurality of update sub-files is not stored in a memory of the first device based on a comparison of a corresponding one of the hash codes included in the descriptor file with the hash code for one or more of the plurality of update sub-files currently stored in the memory;
   downloading the one of the plurality of update sub-files to the first device;
   broadcasting the one of the plurality of update sub-files from the first device to other ones of the plurality of local computing devices using a broadcast protocol of the local network; and
   comparing the hash codes of the update sub-files provided in the descriptor file to the hash codes for sub-files stored in the memory of the first device and, if all sub-files are found to be in the memory of the first device, assembling the threat management policy update from the plurality of update sub-files and installing the threat management policy update.

2. The method of claim 1, wherein the memory of the first device is a cache memory.

3. The method of claim 1, wherein the first device of the plurality of local computing devices downloads the descriptor file and a first update sub-file, and where the first device then broadcasts the first update sub-file to a second device of the plurality of local computing devices prior to the second device receiving the descriptor file, and the second device identifies the first update sub-file as relevant through an identifier for a software update included with the broadcast from the first device, and stores the first update sub-file in memory if the update is determined to be relevant.

4. The method of claim 1, wherein the descriptor file is transmitted to the plurality of local computing devices in a secure manner that includes a digital signature.

5. The method of claim 1, wherein sizes of update sub-files in the plurality of update sub-files are such that the plurality of update sub-files fits in a single broadcast packet.

6. The method of claim 5, wherein the single broadcasted packet includes a copy of the hash code to increase efficiency of a packet receiver process in the other ones of the plurality of local computing devices.

7. The method of claim 1, wherein the broadcast of the update sub-files is encrypted.

8. The method of claim 1, wherein a rate of broadcasts is set low to allow the plurality of local computing devices to perform updates over a period of time to minimize impacts to network utilization.

9. A computer program product comprising non-transitory executable code embodied in a non-transitory computer readable medium that, when executing on one or more computing devices, performs the steps of:
receiving a descriptor file at a first device of a plurality of local computing devices coupled in a communicating relationship to one another through a local network that supports broadcast communications, the descriptor file including a hash code for each one of a plurality of update sub-files and indicating an order in which the plurality of update sub-files assemble into a threat management policy update;
determining if the threat management policy update is relevant to a resident threat management policy on the first device by matching an identifier for the threat management policy update contained in the descriptor file to an identifier for resident software on the first device;
if the threat management policy update is relevant to resident software on the first device, determining that one of the plurality of update sub-files is not stored in a memory of the first device based on a comparison of a corresponding one of the hash codes included in the descriptor file with the hash code for one or more of the plurality of update sub-files currently stored in the memory;
downloading the one of the plurality of update sub-files to the first device;
broadcasting the one of the plurality of update sub-files from the first device to other ones of the plurality of local computing devices using a broadcast protocol of the local network; and
comparing the hash codes of the update sub-files provided in the descriptor file to the hash codes for sub-files stored in memory of the first device and, if all sub-files are found to be in the memory of the first device, assembling the threat management policy update from the plurality of update sub-files and installing the threat management policy update.

10. The computer program product of claim 9, wherein the memory of the first device is a cache memory.

11. The computer program product of claim 9, wherein the descriptor file is transmitted to the plurality of local computing devices in a secure manner that includes a digital signature.

12. The computer program product of claim 9, wherein sizes of update sub-files in the plurality of update sub-files are such that the plurality of update sub-files fits in a single broadcast packet.

13. The computer program product of claim 12, wherein the single broadcasted packet includes a copy of the hash code to increase efficiency of a packet receiver process in the other ones of the plurality of local computing devices.

14. The computer program product of claim 9, wherein the broadcast of the update sub-files is encrypted.

15. The computer program product of claim 9, wherein a rate of broadcasts is set low to allow the computing devices to perform updates over a period of time to minimize impacts to network utilization.

16. A system for updating threat management policies on a plurality of local computing devices, each local computing device including a processor and coupled in a communicating relationship on a local network that supports broadcast communication, the system comprising:
a software update facility in communication with the plurality of local computing devices through the local network, the software update facility including a plurality of update sub-files and a descriptor file stored in memory, the plurality of update sub-files making up a threat management policy update when combined together, and the descriptor file transmitted to the plurality of local computing devices and including a hash code for each one of a plurality of update sub-files; and
an updater processor on each of the plurality of local computing devices, wherein at least one of the plurality of local computing devices downloads one of the plurality of update sub-files from the software update facility, wherein the at least one of the plurality of local computing devices is configured to broadcast the downloaded update sub-file to the other ones of the plurality of local computing devices using a broadcast protocol of the local network, wherein each of the downloads is for an update sub-file that the at least one of the plurality of local computing devices does not currently have stored in its memory as determined based on a comparison of a corresponding one of the hash codes included in the descriptor file with the hash code for one or more of the plurality of update sub-files currently stored in a memory of the at least one of the plurality of local computing devices, and wherein the at least one of the plurality of local computing devices is configured to compare the hash codes of the update sub-files provided in the descriptor file to the hash codes for sub-files stored in its memory and, if all sub-files are found to be in its memory, to assemble the threat management policy update from the plurality of update sub-files and to install the threat management policy update.

17. The system of claim 16, wherein the descriptor file is transmitted to the plurality of local computing devices in a secure manner that includes a digital signature.

18. The system of claim 16, wherein sizes of update sub-files in the plurality of update sub-files are such that the plurality of update sub-files fits in a single broadcast packet.

19. The system of claim 18, wherein the single broadcasted packet includes a copy of the hash code to increase efficiency of a packet receiver process in the other ones of the plurality of local computing devices.

20. The system of claim 16, wherein the broadcast of the update sub-files is encrypted.

* * * * *